H. D. WILLIAMS.
METHOD OF CUTTING GEARS.
APPLICATION FILED DEC. 11, 1917.

1,404,505.

Patented Jan. 24, 1922.
4 SHEETS—SHEET 1.

Inventor:
Harvey D. Williams,
By Milton Tibbetts,
Atty.

H. D. WILLIAMS.
METHOD OF CUTTING GEARS.
APPLICATION FILED DEC. 11, 1917.

1,404,505.

Patented Jan. 24, 1922.
4 SHEETS—SHEET 2.

Inventor:
Harvey D. Williams,
By Milton Tibbetts, Atty.

H. D. WILLIAMS.
METHOD OF CUTTING GEARS.
APPLICATION FILED DEC. 11, 1917.

1,404,505. Patented Jan. 24, 1922.

Inventor:
Harvey D. Williams,
By Milton Sibbetta, Atty.

H. D. WILLIAMS.
METHOD OF CUTTING GEARS.
APPLICATION FILED DEC. 11, 1917.

1,404,505.

Patented Jan. 24, 1922.
4 SHEETS—SHEET 4.

Inventor:
Harvey D. Williams,
By Milton Tibbetts, Atty.

UNITED STATES PATENT OFFICE.

HARVEY D. WILLIAMS, OF WALLINGFORD, CONNECTICUT, ASSIGNOR, BY MESNE ASSIGNMENTS, TO SECURITY TRUST COMPANY, OF DETROIT, MICHIGAN, A CORPORATION OF MICHIGAN.

METHOD OF CUTTING GEARS.

1,404,505.   Specification of Letters Patent.   Patented Jan. 24, 1922.

Original application filed July 25, 1914, Serial No. 853,017. Patent No. 1,324,287, dated December 9, 1919. Divided and this application filed December 11, 1917. Serial No. 206,583.

*To all whom it may concern:*

Be it known that I, HARVEY D. WILLIAMS, a citizen of the United States, and resident of Wallingford, New Haven County, State of Connecticut, have invented certain new and useful Improvements in Methods of Cutting Gears, of which the following is a specification.

This application relates to the method of cutting the gears described and claimed in my co-pending application Serial No. 853,017, filed July 25, 1914, and renewed December 5, 1917, Serial No. 205,664, on which Letters Patent No. 1,324,287 were issued December 9, 1919. The present application is a division of said earlier application.

This invention relates to that class of toothed gearing in which the wheel member of a pair of gears, has the teeth thereof angularly-disposed relatively to a line that is normal to the plane of revolution or in other words parallel to the axis of revolution of such wheel.

In said pending application I have described a system of toothed gearing in which a pair of the gears comprises a wheel having the working surfaces of its teeth conforming to a single-reproduction configuration and a mating pinion having the working surfaces of its teeth conforming to a coacting compound-reproduction configuration; thus the teeth of the gear wheel and the teeth of the mating pinion therefor are of dissimilar formation or configuration. It is one of the objects of the present invention to furnish a method of cutting such toothed gearing.

Also in said pending application I have described gearing in which the profiles-pairs (throughout the length of the tooth surfaces of the wheel) are uniform in relation to a geometric master-form axis and are also uniform in relation to a geometric plane in which said master-form axis is located as therein more fully explained. It is one of the objects of the present invention to furnish a method of cutting such gearing.

Also, in said pending application I have described toothed gearing in which the longitudinal line or geometric axis of each pair of adjacent tooth surfaces is disposed or located in an angular relation to the axis of revolution as in certain kinds of bevel and skew-bevel and skew-spur gears; also such gearing in which the "wheel" of a pair of gears constitutes a master-wheel adapted for operating correctly not only with pinions of varying diameters but also with such pinions located with their axes in various degrees of divergence or axial skew, respectively, from an axial-plane radial to the master-wheel axis and also relatively to the plane of rotation of the wheel. It is one of the objects of the present invention to furnish a method of cutting such gearing.

In view of the intricate kinematical relations involved in the art of toothed-gearing, and especially when the teeth are angularly-disposed, as in the present improvements, I have herein employed the term "wheel" for designating the gear having the teeth thereof provided with the working-faces having a single-reproduction configuration, and have designated the mating gear as the "pinion," without regard, however, to their relative actual sizes but having in mind that usually the wheel is larger than the pinion, and that while either one may be used as the driver, the smaller said gear will preferably and usually be the pinion and be employed as the driving member of the pair of gears.

In my improved toothed gearing above referred to the "wheel" has working faces of a form adapted to be readily precisioned, and these working surfaces are arranged in a longitudinal parallelism, and also in a transversely converging relation to each other. The generated or evolution form of tooth-surfaces is thus restricted to one gear (the pinion) of the pair, while the other gear, or wheel, has non-evolved teeth of a shape and relative size which are more readily producible with the required high degree of precision, and which are producible and repairable by the use of simple and ordinary appliances and methods and without requiring the use of any generating machines for forming or shaping the tooth surfaces. Thus the present invention comprises a method of producing a pair of bevel gears by cutting one of said gears, as the wheel, by a single-reproduction relative movement between the wheel blank and the cutting edges of a tool to thereby produce a pair of adjacent tooth surfaces which have parallel surface elements and which together constitute a master-form, and in cutting the other of said gears, as the pinion, by a compound-reproduction relative movement between the pinion blank and cutting edges which correspond to such master-form.

In the accompanying drawings which form a part of this specification, I have illustrated the novel form of gearing produced by the method forming the subject matter of this invention, and I have likewise indicated, somewhat diagrammatically, the various tool and blank movements which are gone through with in the cutting of these gears.

In the drawings.

Fig. $2^a$ is a fragmentary view drawn below and in alinement with Fig. 2, and showing a portion of the spur-wheel B (Fig. 2), and in plan or face view, a pair of tooth-surfaces, as $f^3$, $f^5$, arranged with a tooth-space between them and also located with an obliquity indicated by the angle $e^6$;

Fig. $3^a$ is a similar fragmentary plan or face view of a portion of the bevel wheel B, (Fig. 3), showing a pair of the tooth-surfaces, as $f^3$, $f^5$, arranged on the face or tooth-zone N, with the master-form axis $x$ located in a plane of the axis-of-revolution, $c$, of the wheel;

Figs. 12, 13 and 14 are views similar to Figs. 7, 10 and 8, respectively, for illustrating the counter-part tools J and T for making pairs of tooth-surfaces in skew-spur wheels by the method of single-reproduction, and when the master-form axis $x$ is in the position $x^{13}$, Fig. 5;

Fig. 15 is an oblique view for more fully and clearly exhibiting the features indicated in Figs. 12, 13 and 14;

Fig. 16 is a view similar to Fig. 9, for illustrating the manner of applying the master-form tool T (Figs. 12 and 13) for making pairs of generated tooth-surfaces on the skew-spur pinion by the method of compound-reproduction, and for mating with a skew-spur wheel such as indicated in Figs. 1, 2, $2^a$, and in Figs. 12, 14, 15;

Fig. $16^a$ is a view drawn in alinement with Fig. 16 showing the skew-spur pinion, (as seen from the left hand in Fig. 16); and Fig. $16^b$ is a view of the said pinion as seen from above in Fig. $16^a$.

In a pair of intermeshing gears, and as between the body of a wheel-tooth and the body of a pinion-tooth, the proper rolling movement requires, in any given instance, some aggregate amount of transverse-curvature, or profile deviation, of the one tooth-surface relatively to the other, and in the former practice it was customary to apportion that total relative curvature one part to the wheel and the remaining part to the pinion and to make a different apportionment for each pair of gears having different relative diameters. In this system of gearing, and contrary to that former practice, no such separate apportionments are required, but the whole of such relative deviation may be applied to the pinion-tooth surfaces. This feature combined with the longitudinal-parallelism of the pairs of wheel tooth-surfaces, and with these surfaces transversely converging, is a means for bringing the two said members of the pair of gears into such a relationship that in addition to having the improved operational features herein set forth, the wheel teeth can be made on a series of wheels by the single-reproduction method and with the same master-form and the same counterpart tool, while only the pinions require the compound-reproduction method for their manufacture.

In a pair of mating gears for operating in only one direction, each of the coacting teeth need have, as is well known, only one working-surface, but these working-surfaces, in the gearing herein described, are of the single-reproduction arrangement and configuration on the wheel-teeth and have uniform profiles throughout their length, while the coacting tooth-surfaces on the pinion teeth are conjugate to said wheel-tooth working-surfaces and are of the compound-reproduction arrangement and configuration. Each wheel-tooth working-surface has uniform profiles throughout the length thereof and is of the single-reproduction configuration, but when each of said teeth has two such working-surfaces, and has these arranged in such relation that a pair of them (either two surfaces on one tooth or two surfaces on each of two adjacent teeth), are formed in parallel, such pair of working-surfaces is said to conform to the single-reproduction arrangement and configuration; and, conversely, the coacting pinion-tooth working-surfaces will then be formed in pairs which are said to conform to the compound-reproduction arrangement and configuration. When thus organized, each pinion-tooth is provided with a pair of working-surfaces which are individually conjugate to the respective working-surfaces of said wheel-tooth pairs, and which also, when taken as, or in pairs, conform to the compound-reproduction arrangement and configuration. In these arrangements, the wheel-tooth working-surfaces are, of course, "transversely-converging," either outwardly, as in Fig. 6ª, or inwardly, as in Fig. 6.

In this system of oblique toothed gearing, the pinion has the working-surfaces of its teeth, (which are sometimes herein also designated as "tooth-faces," and as "tooth-surfaces") shaped according to a compound-reproduction, which may be effected,—as hereinafter set forth,—by means of the counterpart tool having a movement parallel to the obliquely-located axis, as $x$ (see Figs. 8, 9) of the master-form, as F, of the wheel, and also having concurrently with and relatively to the pinion, a rolling movement in accordance with the geometric pitch-surfaces.

Figure 2:
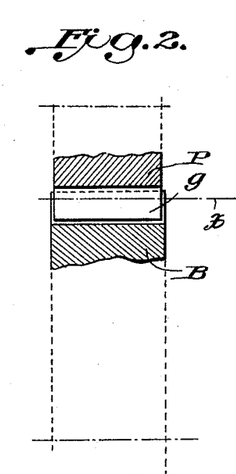
Fig. 2 is a fragmentary sectional view (drawn in alinement with Figs. 1 and 3, as indicated by the dotted line $x$—$x$, which in Fig. 1 passes through the master-form axis at $x$) showing portions of a spur-wheel and pinion having teeth which are here shown in side view, and which correspond in construction with those indicated in end view in Fig. 1.

Usually the larger gear, as B, Fig. 2, of a pair of these oblique gears is properly regarded as being the "wheel." This wheel member is provided with obliquely-disposed teeth which have their working-surfaces arranged in transversely converging pairs in which each of said tooth-surfaces has a uniform profile throughout the length thereof. These tooth-surfaces are also arranged in pairs which are longitudinally parallel the one to the other, so that in any such pair of tooth-surfaces their normal operation involves a peculiar progressively meshing action as between the wheel tooth-faces and the faces of a co-meshing pinion. This peculiar meshing action,—for the sake of brevity and for the want of a better term,—I have designated as a "skew-action." In this gearing, therefore, there is a certain skew-action of the tooth-faces which is normal to the operation of the gears, and which involves a relatively progressive meshing, longitudinally of the teeth during the approach into full-mesh,—so that some variation in the skew angles does not, in effect, create a different kind of coaction, although varying the same in both a qualitative and quantitative manner. Thus a skew-action involving a longitudinally - progressive meshing, as between the working-surfaces of the obliquely-disposed wheel-teeth and the coacting but differently shaped surfaces of the pinion teeth, is obtained with pinions of different sizes and having respectively, different skew or angular locations of the pinion-axis relatively to the wheel-axis.

Figure 6:
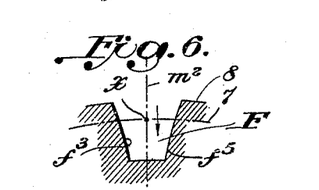
Figs. 6 and $6^a$ are diagrams for illustrating certain features hereinafter more fully explained, regarding the outward and the inward arrangements of the convergence of the tooth surfaces.
Figure 6A:
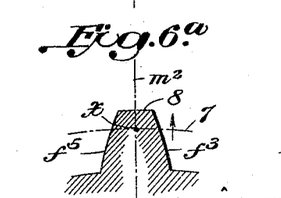

The aforesaid directly-coacting faces being arranged in converging pairs, and these pairs, as $f^3$, $f^5$, Fig. 6 and $f^3$, $f^5$, Fig. 6ª, being alike except as to the direction of the convergence (here shown by arrows), each such pair of the converging faces constitutes a structural feature which I designate as the "master-form." A further feature of this "master-form" is the longitudinal parallelism of the said two transversely-converging tooth-surfaces which are comprised therein, and the similar parallelism of the surface-element lines of such tooth-surfaces relatively to a geometric "master-form-axis," as $x$. In some of the views the master-form is shown applied to the wheel-tooth, which thus has parallel faces, while in other views the master-form is shown applied to the tooth-spaces, as F, the wheel-tooth surfaces, as $f^3$, $f^5$,—being shown offset in parallel from the master-form-axis $x$.

Figure 3:
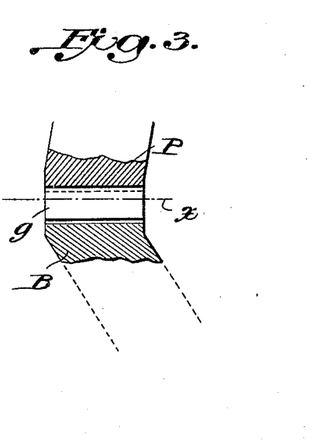
Fig. 3 is a similar fragmentary sectional view showing portions of a bevel wheel and pinion having teeth which are here shown in side view, and which correspond in construction with those indicated in end view in Fig. 1.
Figure 3A:
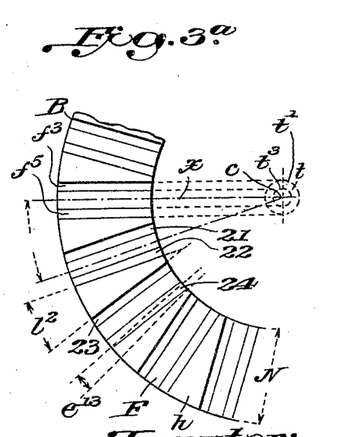
Figure 5:
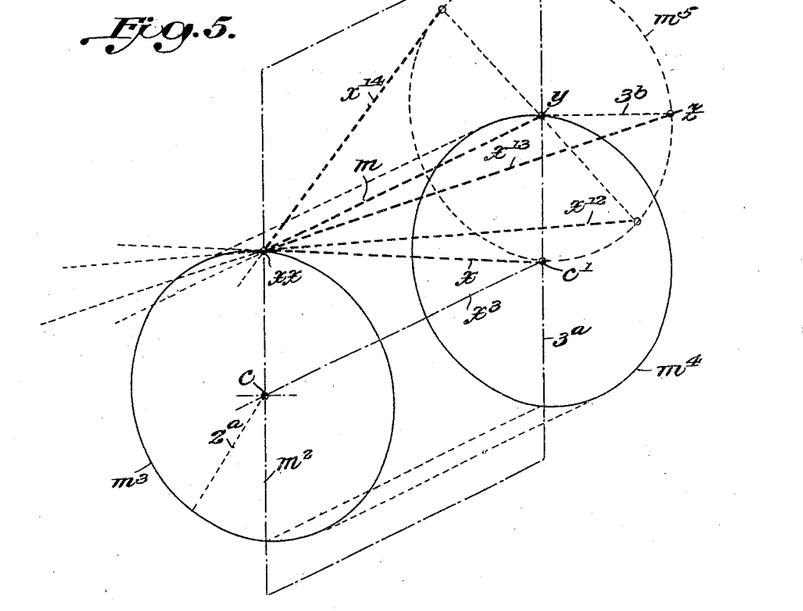
Fig. 5 is a diagram drawn in a manner similar to a perspective view, for illustrating the geometrical relations of certain features of the wheel member of a pair of the gears, and for showing the master-form-axis in three arrangements or locations coinciding, respectively, with three locations of a certain hypothenuse line which is here shown in the successive positions $x$, $x^{12}$, and and $x^{13}$.

In a pair of these gears, when the wheel has the master-form with its center-line, as $x$, (see Fig. 3ª) in the position $x$, Fig. 5, where said center-line is shown located in a plane radial to the wheel axis, the two tooth-surfaces, as $f^3$, $f^5$ (see Fig. 3ª), have a skew-angle, $e^{13}$, relation to said wheel-axis, one of them, as $f^3$, has a rearward skew. Similarly, the pinion P has its tooth-surfaces arranged with their bounding master-form surfaces, and hence their surface elements in general,—located on similar skew-angles, and these in relatively the same order of arrangement. When the action-face, as $f^3$, of the wheel has a rearward skew, (see Fig. 3ª), the amount of which is indicated by the angle $e^{13}$, the coacting pinion tooth-surface will have a corresponding amount of skew in the said direction. In this pinion construction, therefore, the masterform of or for the pinion tooth-surfaces has the two sides thereof in longitudinal parallelism, in this respect corresponding with the wheel construction. When the wheel master-form has the inwardly-converging longitudinally parallel surfaces (and therefore has the parallel spaces, as F) the pinion master-form has, relatively to the pinion pitch-surface, the outwardly-converging arrangement of the said "master-form" bounding-surfaces or tooth-faces. Therefore, these two master-forms come into the same positions and coincide when the two engaging tooth-sections also come to the exact full-mesh position.

Figure 4:
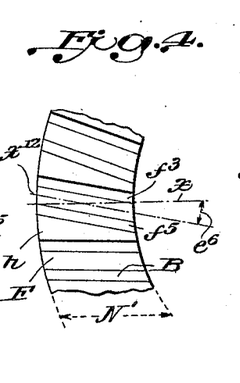
Fig. 4 is a view similar to Fig. $3^a$, but showing the pair of tooth-surfaces arranged on the tooth-zone or face, N', with an obliquity as indicated by the angle $e^6$.

In each of the described arrangements of the convergence of the said wheel tooth-surfaces, these wheel-tooth surfaces, (in any series of the master-forms having the longitudinally parallel construction), are so arranged and related that, as shown in Fig. 4, in any group of three successive wheel tooth faces, two of these are arranged in parallelism with each other, and since in practice at least three successive wheel-tooth faces will be in mesh to the extent of having a full working engagement, therefore at all times in such a set of three successive faces there is a direct parallel (directly opposite) action and re-action, respectively, upon a pair of longitudinally-parallel faces which are one of them next succeeding to the other of them in the circumferential tooth-zone N of the wheel. This peculiar relationship and mode of coaction, is indicated in Figs. 3$^a$ and 4, and other views, and particularly in said Fig. 3$^a$, where the two inwardly-converging successive faces 21 and 22 are in parallel, while the next successive face, 23, is at an angle, as 1$^2$, thereto. Also in said Fig. 3$^a$, another set of three successive faces comprises the two outwardly-converging longitudinally non-parallel faces 22, 23, and the next succeeding parallelly-disposed face 24. In each of these two sets of groups, the directly opposite action and reaction is indicated by the parallelism of the two oppositely-acting faces, as 21, 22, in the one set and 23, 24 in the other set.

Referring to the diagram Fig. 5, if a line, as 2$^a$, which is normal to the axis $x^3$ at the point $c$, be rotated about said axis, the outer end of said line 2$^a$ describes the meridian circle $m^3$, located in a plane of rotation. At some other point, as $c'$, on said axis $x^3$, describe a similar circle as $m^4$, also in a plane of rotation; the two circles then lie in parallel planes, and these planes are at right-angles to the axial line $x^3$, which represents the axis of rotation of any gear or wheel that shall be drawn out or designed in accordance with the diagram thus arranged or proportioned. In practice, as will be evident, the diagram, Fig. 5, may be made of such proportions as are suitable for meeting the requirements in any given pair of gears to be made in accordance with my present improvements. It will be seen that the circle $m^5$ is an orbital path in which the point $z$ may be said to revolve around the point $y$ of the circle $m^4$. Said orbital circle $m^5$ is shown divided by the lines 3$^a$, 3$^b$, into arcs, of which the quadrant $c'$ to $z$ is the lower right-hand quadrant, extending in the circle $m^5$ from the line $x$, at the point $c'$, to the line $x^{13}$, at the point $z$, these lines $x$ and $x^{13}$ being different positions of a hypothenuse line.

Figure 2A:
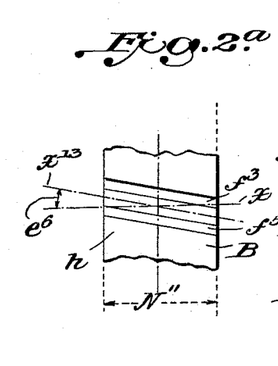
Figures 12, 13, 14, 15, 16, 16A:
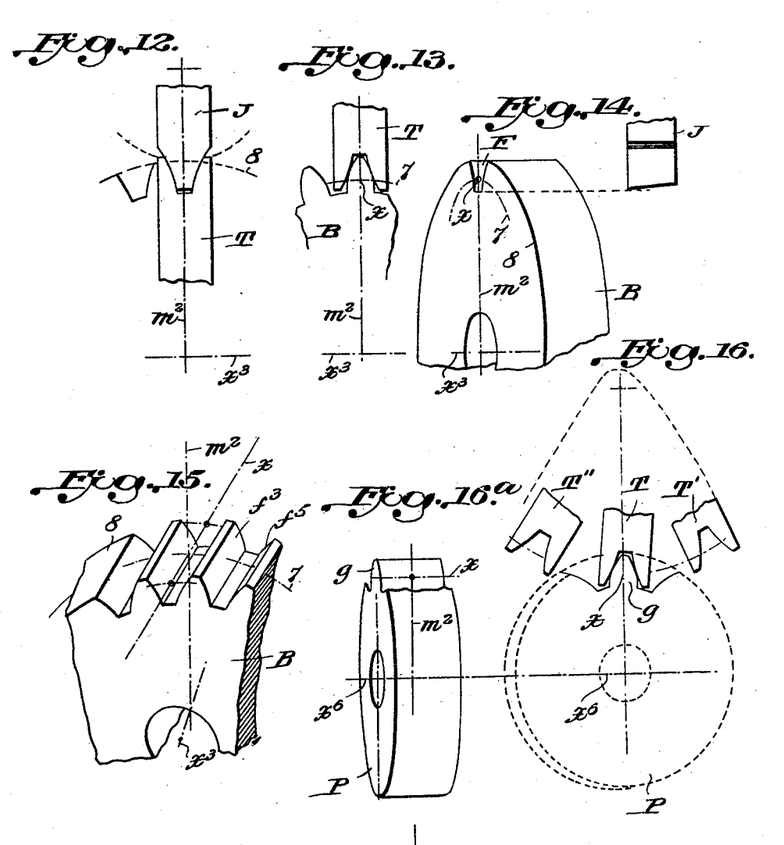
Figure 16B:
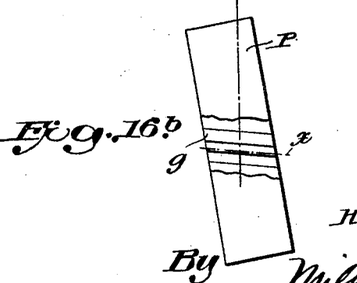

The said hypothenuse line, as $x^{13}$, at the vertex $xx$ of the triangle $xx$, $y$, $z$ Fig. 5, intersects or contacts with the instant axis, $m$, and this is in a plane of rotation which, for convenience, I designate as the meridian plane, and in which lies the circle $m^3$; this plane is also the "profile" meridian. When the described locating-triangle $xx$, $y$, $z$, Fig. 5, has the plane thereof, (which is indicated by the line $y$, $z$) located in a tangential relation to the meridian-circle $m^3$, and also tangential to the geometric surface-of-revolution generated by the instant axis $m$ revolving about the wheel-axis $x^3$, and the tooth-zone of the wheel, as N'', Fig. 2$^a$, being located contiguous to said meridian-circle $m^3$, the gear-wheel (see Fig. 15) is then of the particular kind which I designate as "skew-spur" gearing.

Figure 1:
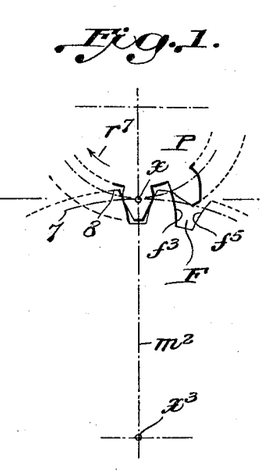
Fig. 1 is a diagrammatic view illustrating (but in a general way only) certain relations of the wheel and pinion, and especially the relation of their respective tooth-surfaces with each other.

In a pair of these gears, when the wheel has the master-form with its center-line, as $x$, Fig. 5, in the position $x$, (which is also in a plane radial to the wheel axis) the two tooth-surfaces, as $f^3$ and $f^5$ (see Fig. 3$^a$) have a skew-angle relation to said wheel-axis, one of them, as $f^5$, having a forward skew while the other said face, as $f^3$, has relatively a rearward skew. Similarly, the pinion P has its tooth-surfaces arranged with their bounding master-form surfaces, and hence their surface elements in general, located on similar skew-angles, and these in relatively the same order of arrangement. When the action-face, as $f^5$, of the wheel has a rearward skew, the amount of which is indicated by the angle $c^{13}$, the coacting pinion tooth-surface will have a corresponding amount of skew in the said direction. In this pinion construction, therefore, the master-form of the pinion tooth-surfaces has the two sides thereof in longitudinal parallelism, in this respect corresponding with the wheel construction. But when the wheel master-form has the inwardly-converging longitudinally parallel surfaces, (and therefore has the parallel spaces), as F (Fig. 1) the pinion master-form has, relatively to the pinion pitch-surface, the outwardly-converging arrangement of the said "master-form" bounding-surfaces or tooth-faces. Therefore these two master-forms come into the same positions and coincide when the two engaging tooth-sections also come to the exact full-mesh position, this being illustrated at $x$, Fig. 1.

From the foregoing description as herein illustrated, it will now be evident how the master-form-axis is not only a line located in a plane, but also is a line having an angular position relatively to the wheel-axis, to the plane of rotation and to any straight-line that is a normal to (perpendicular to) such plane of rotation; and how, in the pinion the corresponding tooth-surface axial lines, of the respective tooth-surface pairs, are rotational trace-lines of said wheel master form axis, $x$.

In practice, any desired number of exchangeable pinions of different sizes respectively, may have their working-surfaces shaped by the method of compound-reproduction, or "evolution", from and by the counterpart of the same master-form F, by generating the pinion teeth from a rolling movement on the geometric pitch-surfaces. In this operation pitch-surfaces resulting from the rolling movement will, of course, meet on an axial line, as $x$, Figs. 9 and 16. In any such case, however, the same counterpart tool, as T, having a profile outline coinciding with said master-form (or a suitable correspondingly-shaped milling-cutter, —not shown,—in lieu thereof), will properly generate the corresponding pinion-tooth curved-surface of the conjugate form for working correctly upon the tooth-surfaces of such master-wheel. Thus a single master-wheel may constitute a master or form for generating the teeth on any plurality of pinions of different sizes, respectively, and each specially shaped for rolling correctly in mesh with that one master-wheel; but these different pinions, being each thus specially shaped, are not thereby formed for working in mesh with each other, nor with a master-wheel of a different size or proportion. In all such instances, however, the pinion tooth-surface may be properly described as having a developed curvature generated "according to" the tooth-surfaces of the mating master-wheel of the pair. These pinion tooth-surfaces are said to be "generated" because in practice they will be, usually and preferably, produced in and by some suitable gear-tooth-generating machine, the tooth-surfaces being developed from and by a tool whose cutting lines are made "according to" the "form" of the master wheel pairs of tooth-surfaces, so that the resultant or conjugate "tooth face transverse curvature" will be of the same "developed" formation as if the tooth surfaces of the pinion were actually moulded into shape by the rolling of the pinion in mesh with its own master-wheel.

I will now briefly explain one method of making the master-form surfaces of the wheel, (first referring to conical wheels having obliquely-disposed tooth-surfaces), and the use of the counterpart tools for making the conjugationally-curved pinion-tooth surfaces by the duplicate of the master-form of the wheel with which such pinion is to mesh.

Figures 7, 8:
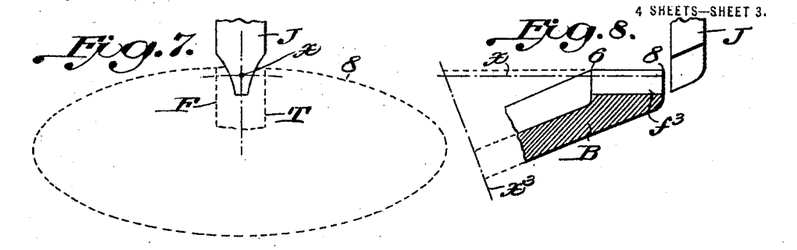
Figs. 7, 8 and 9 are diagrammatic views illustrative of the preferred method of making the gears when the wheel B (in a conical form thereof) has the master-form planes inwardly-converging.

In Fig. 7 the ellipse 8 is the outer circle of the wheel B, the line of sight being parallel to the axis $x$ of the centrally located master-form at F; this view also shows the working-surfaces of said master-form arranged inwardly-converging. In Fig. 8 a section is shown of the tooth-rim of the wheel B, as seen from the right-hand in Fig. 7, the tooth-surface $f^3$ being shown fully formed, while the master-form axis $x$ indicates, also, the line of movement of the tool J, the profile-outline of which (Fig. 7) should correspond with some selected master-form F, for the wheel B. The wheel-blank being properly held in a well-known manner in a suitable indexing-shaping machine (not shown), and the tool J being reciprocated while carried in the usual tool-holder of such well known shaping machine the tool may then be fed gradually downward to its said position in Figs. 7 and 8, thereby "reproducing" the form of the tool in a reversed arrangement in the wheel rim and with only a "single" direction or kind of movement as between the wheel and the tool and thus completing one pair of parallel tooth-surface by the "single-reproduction" method. This operation being repeated around the wheel at each pitch-arc interval, all the tooth-faces will be similarly completed.

In said Fig. 7, for the purpose of comparing a pair of tools, a counterpart tool T, is indicated by dotted lines in a position in which it exactly matches the aforesaid tool J, and is an exact counterpart of the tooth-form of the wheel. Such a counterpart tool is shown at T, Fig. 9, as employed for making the pinion-tooth $g$ of a conjugate-curvature for correctly operating with the aforesaid tooth-form faces $f^3$ and $f^5$ of the wheel. For this purpose, the tool T may be given the well known "planer-movement" in the line of the tooth-form axis $x$ (coinciding with the line of sight in Fig. 1) and at the same time will swing in a circle, as 8 (herein seen as an ellipse) coinciding with the geometric pitch-surface of the wheel; that is, the tool T has a "compound" motion, comprising a reciprocatory or working movement in the line of the "instant-axis" of the wheel, while this line of movement also revolves about the axis of the wheel. During this compound or generating operation, the pinion blank P also revolves, (as indicated by arrows in Fig. 9) until the tool T has swung from the initial position T' to the final position T'', thereby completing both of the faces of the pinion-tooth $g$ by a single operation of the machine, and by a method of "compound-reproduction" whereby the complete "master-form" with its surfaces of uniform profile and parallel construction is reproduced in a conjugational manner in the curved faces of the similarly parallel pinion teeth.

Figures 9, 10:
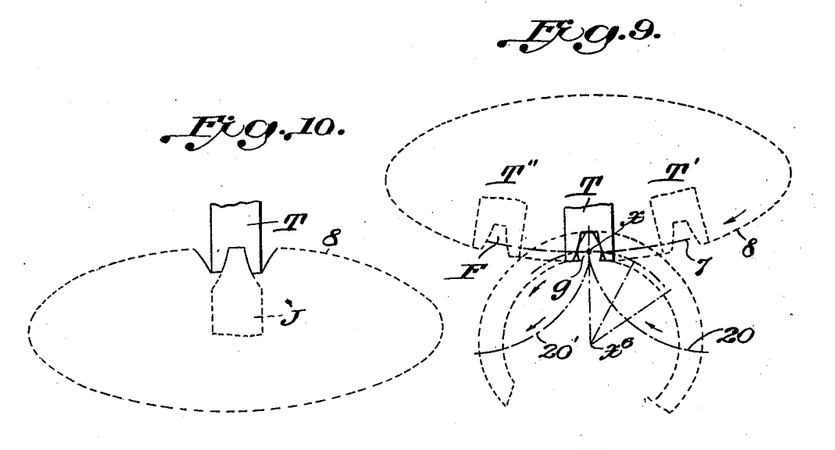
Figs. 10 and 11 are views similar to Figs. 7 and 9, respectively, for similarly illustrating the method when applied to the making of gears in which the said master-form planes are outwardly-converging.
Figure 11:
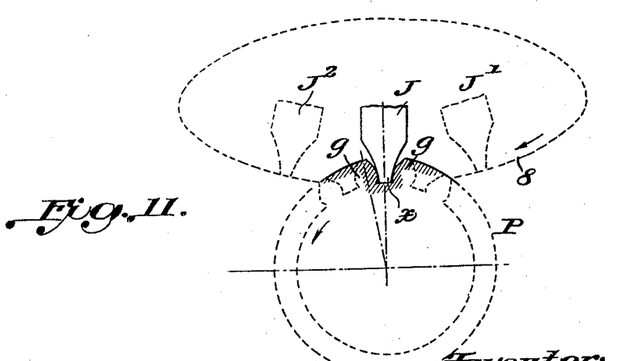

Figs. 10 and 11 correspond to said Figs. 7 and 9, respectively with the exception that the tools J and T are changed places, the tool T being shown in Fig. 10 as used for making the wheel-tooth, and with the master-form faces outwardly-converging, but with the single-reproduction, as before. In the companion view, Fig. 11, the counterpart tool J is shown as used for "generating" the corresponding and oppositely-disposed curved faces of the pinion-teeth, with and between which the said wheel-tooth $g$ is to directly coact. Thus in each arrangement of the master-form, the two counterpart tools by one operation of each of the tools produce four faces arranged in two pairs for direct coaction, and arranged on the lines of parallel master-forms which are identical for both the wheel and the pinion.

In making the pinions by this method of compound-reproduction, the mechanism (not shown) may be operated to carry the tool, as T, Fig. 9, or J, Fig. 11, from one said position to the other, for thereby completing one pair of the conjugate faces, as in Fig. 9 or in Fig. 11; next the pinion will be indexed through one pitch arc, and the next pair of faces be made by a reverse movement of the rolling members, to carry the tool from the said left hand position to the said right hand position as in Figs. 9 and 11. Thus two pinion faces may be completed with a single tool during a single operation of the machine.

The "form" or configuration of the tooth-surface may be said to include the features of outline, or profile, and the relative position thereof. The character of the profile depends, of course, on the kind of reproduction, whether single, (as in the case of the wheel), or compound, (as in the case of the pinion); the position depending on the direction of the transverse convergence, whether inwardly or outwardly.

As thus applied to the wheel, each profile or side line, as $f^3$ or $f^5$ of the form F, gives, always by the same direct reproduction, the shape or profile, and also the position or angular relation, to one tooth-surface in each said arrangement of the wheel construction. In the primary arrangement, the said master-form, as represented in a tool (as T, Figs. 9, 16), that is coincident therewith, and by the use of the single-reproduction method, produces a pair of tooth-surfaces bounding the body of one and the same tooth, (Fig. 6ª), and therefore gives to this tooth an actual sectional shape and size which is the exact counterpart of said geometric master-form. In the secondary arrangement, the same results as to outline and relative position are produced (as by the tooth J, Fig. 11), on the two adjacent tooth-surfaces of two adjacent tooth-bodies, respectively, but with the sectional shape and size applied to the tooth-spaces.

In practice, it is desirable that the angular variations of the gear-axes shall only be adopted within moderate limits, but these limits, however, may vary somewhat from the specific proportions herein illustrated. The limits within which the relative location of the pinion axes may be varied as herein described, can readily be ascertained in practice by trial or by the aid of suitable graphic methods, having in view the extent to which in any given instance the relative obliquity which may be desirable as between the pinion tooth-faces and the pinion-axis; in most cases an angle of obliquity of about 10 degrees is deemed to be within practicable working limits. The range of variation which in practice it may be feasible to adopt, as to axial obliquity, I have herein designated as the "co-operative relation" of the pinion axis relatively to the wheel axis. In this connection it will, of course, be understood that the specific character or conjugate shape of the working surfaces of the pinion teeth will vary, in pairs of gears, otherwise the same, but having some particular axial obliquity in order to make such pinion surfaces properly conform to the required compound-reproduction arrangement and configuration.

Since each wheel-tooth working-surface has uniform profiles throughout the length thereof and is of the single-reproduction configuration, when each said tooth has two such working surfaces, and these are arranged in such relation that a pair of them (either two surfaces on one tooth or two surfaces on each of two adjacent teeth), are formed in parallel, then such pair of working-surfaces is said to conform as pairs to the single-reproduction arrangement and configuration; and, conversely, the coacting pinion-tooth working-surfaces will then be formed in pairs which are said to conform as pairs to the compound-reproduction arrangement and configuration. When thus organized, each pinion-tooth is provided with a pair of working-surfaces which are individually conjugate to the respective working surfaces of said wheel-tooth pairs, and which also, when taken as or in pairs, conform as pairs to the compound-reproduction arrangement and configuration. The obliquely-located wheel-pair of said tooth-surfaces being of an untwisted form or construction, it follows that the mating pair of pinion-tooth-surfaces will be not only obliquely-located but also will have a twist throughout the length thereof.

By reason of the sameness of organization set forth of the master-forms of both wheel and pinion, and the reversal of the relative direction of the convergence (in the wheel and pinion, respectively), of a directly-coacting pair of these master-forms, (see Figs. 7, 10 and 12, 13) when the counterpart tool T (Figs. 9, 16) is employed for generating the pinion curved-surface toothfaces, by the described compound-reproduction, it follows that this operation being begun at any one point, may then continue without change until the entire length of the tooth is completely shaped, and with the result of forming the opposite toothsurfaces of a transversely curved shape or profile which has a constantly changing profile-curvature throughout the length of the pinion tooth, and thereby producing on the pinion, a tooth characterized by the feature of having the opposite working-surface primary elements in parallelism.

An immediate and important practical result of this system of parallel-construction combined with angular-location as applied to both the pinion-teeth and wheel toothspace from identical tooth-form profiles (in addition to the great advantage and economy, as already explained, of eliminating the compound-reproduction otherwise required for making the wheel teeth), is the complete elimination of the difficult setting and gauging operations which are necessary, as regards both wheel and pinion, in the manufacture of gears having teeth of a cross-section which varies in form or size, or both, along the length of the tooth. Also in this parallel-construction, the pinion tooth may be completely shaped and sized without the danger of a variation in widths of successive teeth being caused by any inaccuracy in the indexing of the wheel blanks, when the teeth are made by cutting operations; thus I avoid one of the causes of imperfection appertaining to the manufacture of skew-toothed, or oblique, gearing in geartooth-generating machines.

In the operation of the machine, in making the wheel, the reciprocating tool at all points in the tool-section, including (of course) all points in the profile-lines, moves in lines parallel to the line which, (in the symmetrical position of a pinion tooth), lies in (or in touch with) the geometric pitch-surface, and from which in the rolling movement of the gears, the similar line of the pinion describes an epicycloid at the point or points thereof which in said movement lie in both pitch-surfaces while at said symmetrical position. This is indicated in Fig. 9 by the paths 20, 20', of the masterform axis of the pinion, this axis being, so to speak, merged at $x$ with the corresponding wheel master-form axis, since in the symmetrical position shown in Fig. 9, (also in Figs. 1, 11, 12, 13 and 16), those two masterform axes coincide, that is, occupy the same position.

Having thus described my invention, what I claim and desire to secure by Letters Patent is:—

1. A method of cutting a bevel pinion consisting in producing a relative cutting movement between a pinion blank and a cutter of the profile form of the tooth surface of a bevel gear wheel with which the pinion is to mesh, and producing a relative profile generating movement as of a cone rolling upon another cone between the blank and cutter corresponding to the relative movement of the finished pinion and a mating bevel gear when one is rolling upon the other.

2. A method of cutting a bevel pinion consisting in producing a relative cutting movement between a pinion blank and a pair of relatively fixed cutting edges having the profile form and relative arrangement of a pair of adjacent tooth surfaces of a bevel gear wheel with which the pinion is to mesh, and producing a relative profile generating movement as of a cone rolling upon another cone between the blank and cutting edges corresponding to the relative movement of the finished pinion and a mating bevel gear when one is rolling upon the other.

3. A method of producing a pair of bevel gears consisting in cutting one of said gears, as the wheel, by a single-reproduction relative movement between the wheel blank and two cutting edges engaging different toothsurfaces of said blank to thereby produce a pair of adjacent tooth surfaces of uniform profile and with parallel surface elements constituting a master form, and in cutting the other of said gears, as the pinion, by a compound-reproduction relative movement as of a cone rolling upon another cone between the blank and cutting edges corresponding to such master-form.

4. A method of producing a pair of bevel gears consisting in cutting one of said gears, as the wheel, by a single-reproduction relative movement between the wheel blank and two cutting edges engaging different toothsurfaces of said blank to thereby produce a pair of adjacent tooth surfaces of uniform profile and with parallel surface elements constituting a master-form, and in cutting the other of said gears, as the pinion, by a compound-reproduction relative movement of conical rolling character between the blank and cutting edges corresponding to such master-form, such latter movement including a relative rolling of the blank and tool as of two pitch cone surfaces on each other.

5. A method of producing a pair of bevel gears consisting in cutting one of said gears, as the wheel, by a single-reproduction relative movement between the blank and two relatively fixed and laterally-spaced cutting edges to thereby produce a pair of adjacent tooth surfaces with parallel surface elements, and in cutting the other of said gears, as the pinion, by a compound-reproduction relative movement as of a cone rolling upon another cone between the blank and two relatively fixed cutting edges having profiles corresponding to said pair of adjacent tooth surfaces.

6. A method of producing a pair of bevel gears consisting in cutting one of said gears, as the wheel, by a single-reproduction relative movement between the blank and two relatively fixed and laterally-spaced cutting edges to thereby produce a pair of adjacent tooth surfaces with parallel surface elements, and in cutting the other of said gears, as the pinion, by a compound-reproduction relative movement as of a cone rolling upon another cone between the blank and two relatively fixed cutting edges having profiles and fixed relation corresponding to said pair of adjacent tooth surfaces, such latter movement including a relative rolling of the blank and tool as of two pitch cone surfaces on each other.

7. A method of producing a pair of bevel gears consisting in cutting one of said gears, as the wheel, by a single-reproduction relative movement between the blank and the cutting tool, the line of action of said tool relatively to the blank being skew to the axis of the blank and in cutting the other of said gears, as the pinion, by a compound-reproduction relative movement as of a cone rolling upon another cone between the blank and a cutting tool having a profile corresponding to the tooth face cut on the wheel.

8. A method of producing a pair of bevel gears consisting in cutting one of said gears, as the wheel, by a single-reproduction relative movement between the blank and the cutting tool, the line of action of the tool relatively to the blank being skew to the axis of the blank and in cutting the other of said gears, as the pinion, by a compound-reproduction relative movement between the blank and a cutting tool having a profile corresponding to the tooth face cut on the wheel, such latter movement including a relative rolling of the blank and tool as of two pitch cone surfaces on each other.

9. A method of producing a bevel pinion consisting in producing a compound motion between a pinion blank and a tool, such motion comprising a relative working movement longitudinally of the tooth and a generating movement involving the relative rolling of the blank and the tool on conical pitch surfaces coinciding with the geometric pitch cone surfaces of the blank and a bevel gear wheel with which the blank is to mesh.

10. A method of producing a bevel toothed pinion by compound reproduction consisting in giving a pinion blank and tool a relative working movement longitudinally of the tooth and producing a relatively rolling movement of the blank and tool on the geometric pitch cone surfaces of the blank and of the bevel gear wheel with which said pinion is to mesh.

11. A method of producing a bevel toothed pinion by compound-reproduction consisting in giving a relative working movement to a pinion blank and a tool of the profile form of the tooth surface of a gear wheel with which the said pinion is to mesh, and producing a relatively rolling movement of the blank and tool on the geometric pitch cone surfaces of the blank and of said bevel gear wheel.

12. A method of cutting a bevel pinion consisting in producing a rectilinear relative cutting movement between a pinion blank and a cutter of the profile form of the tooth surface of a gear wheel with which the pinion is to mesh, and producing a relative profile generating movement between the blank and cutter corresponding to the relative movement of the finished pinion and a mating bevel gear when the pitch cone of one is rolling upon the pitch cone of the other.

13. A method of producing a pair of bevel gears consisting in cutting one of said gears, as the wheel, by a single-reproduction rectilinear relative movement between the wheel blank and two cutting edges engaging different tooth-surfaces of said blank to thereby produce a pair of adjacent tooth surfaces of uniform profile and with parallel surface elements constituting a master-form, and in cutting the other of said gears, as the pinion, by a compound-reproduction relative movement as of a cone rolling upon another cone between the blank and cutting edges corresponding to such master-form.

14. A method of producing a bevel toothed pinion by compound-reproduction consisting in giving a pinion blank and tool a rectilinear relative working movement longitudinally of the tooth and producing a relatively rolling movement of the blank and tool on the geometric pitch cone surfaces of the blank and of the bevel gear wheel with which said pinion is to mesh.

15. A method of cutting a pinion tooth surface which consists in producing a relative cutting movement, in a direction skew to the axis of the pinion blank and oblique with reference to a line parallel to said axis, between such pinion blank and a cutter of the profile form of the gear wheel with which the pinion is to mesh, and producing a relative profile generating movement between the said blank and the cutter corresponding to the relative movement of the finished pinion and a mating gear wheel when one is rolling upon the other.

16. A method of cutting a pinion tooth surface which consists in producing a relative cutting movement, longitudinally of the said surface and skew to the axis of the pinion blank and obliquely with reference to a line parallel to said axis, between such pinion blank and a cutter of the profile form of the gear wheel with which the pinion is to mesh, and producing a relative profile generating movement between said blank and cutter corresponding to the relative movement of the finished pinion and a mating gear wheel when one is rolling upon the other.

17. A method of cutting a tooth surface on a pinion blank which consists in producing a relative cutting movement, in a straight line skew to the axis of the pinion blank and oblique with reference to a line parallel to said axis, between such pinion blank and a cutter of the profile form of the gear wheel with which the pinion is to mesh, and producing a relative profile generating movement between said blank and cutter corresponding to the relative movement of the finished pinion and a mating gear wheel when one is rolling upon the other.

18. A method of cutting on a pinion blank a pair of tooth surfaces containing pairs of parallel longitudinal line elements, which consists in producing a relative cutting movement, in a direction oblique with reference to a line parallel to the axis of said blank, between such pinion blank and two cutting edges which are fixed relatively to each other and spaced or offset so as to engage different tooth-surfaces of said blank, and producing a relative profile generating movement between said blank and cutter corresponding to the relative movement of the finished pinion and a mating gear wheel when one is rolling upon the other, to thereby produce a pair of adjacent tooth surfaces each having longitudinal line elements of such character that to each line element of one of said surfaces corresponds a parallel longitudinal line element on the other surface of the same pair.

19. A method of cutting on a pinion blank a pair of tooth surfaces each of which contains longitudinal straight line elements of such character that each straight line element of one of said surfaces corresponds to a parallel straight longitudinal line element on the other surface of the same pair, which consists in producing a relative rectilinear cutting movement between said blank and two relatively fixed cutting edges located laterally of each other with reference to the direction of such movement, which direction is oblique to a line parallel to the axis of the pinion blank, and producing a relative profile generating movement between said blank and cutter corresponding to the relative movement of the finished pinion and a mating gear wheel when one is rolling upon the other.

20. A method of producing a pair of mating gears, which consists in cutting one of said gears, as the wheel, by a single-reproduction relative movement between the wheel blank and two cutting edges arranged on opposite sides of a master-form axis parallel to the direction of said relative cutting movement, to thereby produce a pair of adjacent tooth surfaces of uniform profile and with longitudinal line elements parallel to said master-form axis, and in cutting the other gear, as the pinion, by a compound-reproduction relative movement between the pinion blank and cutting edges corresponding to said master-form.

21. A method of producing a pair of mating gears, which consists in cutting one of said gears, as the wheel, by a single-reproduction relative movement, obliquely with reference to a line parallel to the axis of the wheel blank, between such wheel blank and two cutting edges arranged on opposite sides of a master-form axis parallel to the direction of said relative cutting movement, to thereby produce a pair of adjacent tooth surfaces of uniform profile and with longitudinal line elements parallel to said master-form axis, and in cutting the other gear, as the pinion, by a compound-reproduction relative movement between the pinion blank and cutting edges corresponding to said master-form.

22. A method of producing a pair of mating gears, which consists in cutting one of said gears, as the wheel, by a relative rectilinear single-reproduction movement, obliquely with reference to a line parallel to the axis of the wheel blank, between such wheel blank and two cutting edges arranged on opposite sides of a straight master-form axis parallel to the direction of said rectilinear relative cutting movement, to thereby produce a pair of adjacent tooth surfaces of uniform profile throughout their length and with straight longitudinal line elements parallel to said straight master-form axis, and in cutting the other gear, as the pinion, by a compound-reproduction relative movement between the pinion blank and cutting edges corresponding to said master-form.

23. A method of producing a pair of mating gears, which consists in cutting one of said gears, as the wheel, by a single-reproduction relative movement between the wheel blank and a cutter, in a direction oblique with reference to a line parallel to the axis of said blank, and in cutting the other gear, as the pinion, by a compound-reproduction relative movement between the pinion blank and a cutter of a profile-form which is the counterpart of the wheel-cutter.

24. A method of producing a pair of meshing gears, which consists in cutting one of said gears, as the wheel, by a single-reproduction rectilinear relative movement between the wheel blank and a cutter, in a direction oblique with reference to a line parallel to the axis of said blank, and in cutting the other gear, as the pinion, by a compound-reproduction relative movement between the pinion blank and a cutter of a profile-form which is a counterpart of the wheel-cutter.

25. A method of producing a pair of mating gears, which consists in making one of them, as the wheel, with untwisted tooth surfaces of single-reproduction character, and the other gear, as the pinion, with longitudinally-twisted tooth-surfaces of compound-reproduction configuration, whereby the longitudinal twist of the working tooth-surfaces will be confined to one of said gears, as the pinion, the other gear, as the wheel, being free from such longitudinal twist.

In testimony whereof I affix my signature.

HARVEY D. WILLIAMS.